United States Patent
Kim et al.

(10) Patent No.: US 12,228,836 B2
(45) Date of Patent: Feb. 18, 2025

(54) METHOD OF MANUFACTURING THIN FILM ELECTRODE FOR ELECTROCHROMIC DEVICE AND ELECTROCHROMIC DEVICE INCLUDING THE SAME

(71) Applicant: ELECTRONICS AND TELECOMMUNICATIONS RESEARCH INSTITUTE, Daejeon (KR)

(72) Inventors: Tae-Youb Kim, Seoul (KR); Jisu Han, Daejeon (KR); Hojun Ryu, Seoul (KR); Juhee Song, Daejeon (KR); Chil Seong Ah, Daejeon (KR); Sang Hoon Cheon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 686 days.

(21) Appl. No.: 17/519,465

(22) Filed: Nov. 4, 2021

(65) Prior Publication Data
US 2022/0214589 A1 Jul. 7, 2022

(30) Foreign Application Priority Data
Jan. 6, 2021 (KR) .................. 10-2021-0001537

(51) Int. Cl.
*G02F 1/15* (2019.01)
*C09D 5/00* (2006.01)
(Continued)

(52) U.S. Cl.
CPC ............. *G02F 1/155* (2013.01); *C09D 5/002* (2013.01); *C09D 5/24* (2013.01); *C09D 7/45* (2018.01);
(Continued)

(58) Field of Classification Search
CPC .................................. G02F 1/155; G02F 1/153
See application file for complete search history.

(56) References Cited

U.S. PATENT DOCUMENTS

| 6,734,305 B2 | 5/2004 | Pierre et al. |
| 8,658,251 B2 * | 2/2014 | Kawamoto ............ B82Y 30/00 427/372.2 |

(Continued)

FOREIGN PATENT DOCUMENTS

| KR | 10-2012-0131396 A1 | 12/2012 |
| KR | 10-2013-0070608 A | 6/2013 |

(Continued)

OTHER PUBLICATIONS

Benjamin Folch, et al., "Synthesis and studies of water-soluble Prussian blue-type nanoparticles into chitosan beads", Physical Chemistry Chemical Physics, 2010.

*Primary Examiner* — Joseph P Martinez
(74) *Attorney, Agent, or Firm* — LRK PATENT LAW FIRM

(57) ABSTRACT

Provided is a method of manufacturing a thin film electrode for an electrochromic device, and an electrochromic device manufactured thereby. Specifically, a method of manufacturing a thin film electrode for an electrochromic device includes: synthesizing insoluble Prussian blue nanoparticles; adding a surfactant to the insoluble Prussian blue nanoparticles to form water-soluble Prussian blue nanoparticles; adding a solvent and a binder to the water-soluble Prussian blue nanoparticles to form a mixed solution; applying the mixed solution onto an electrode; and performing a drying process on the electrode applied with the mixed solution, wherein the drying process may be performed at 15° C. to 30° C.

12 Claims, 11 Drawing Sheets

(51) Int. Cl.
      *C09D 5/24*       (2006.01)
      *C09D 7/45*       (2018.01)
      *C09D 7/61*       (2018.01)
      *C09D 7/63*       (2018.01)
      *C09D 179/02*       (2006.01)
      *C09D 183/06*       (2006.01)
      *G02F 1/1343*       (2006.01)
      *G02F 1/153*       (2006.01)
      *G02F 1/155*       (2006.01)
      *G02F 1/1516*       (2019.01)

(52) U.S. Cl.
      CPC ................. *C09D 7/61* (2018.01); *C09D 7/63* (2018.01); *C09D 179/02* (2013.01); *C09D 183/06* (2013.01); *G02F 1/13439* (2013.01); *G02F 1/1533* (2013.01); *G02F 2001/1517* (2013.01)

(56) References Cited

U.S. PATENT DOCUMENTS

| | | |
|---|---|---|
| 9,581,876 B1 | 2/2017 | Cho et al. |
| 2011/0300083 A1 | 12/2011 | Yontz et al. |
| 2020/0081311 A1 | 3/2020 | Ah et al. |

FOREIGN PATENT DOCUMENTS

| | | |
|---|---|---|
| KR | 10-2018-0123844 A | 11/2018 |
| KR | 10-2019-0016189 A | 2/2019 |

\* cited by examiner

METHOD OF MANUFACTURING THIN FILM ELECTRODE FOR ELECTROCHROMIC DEVICE AND ELECTROCHROMIC DEVICE INCLUDING THE SAME

CROSS-REFERENCE TO RELATED APPLICATION

This U.S. non-provisional patent application claims priority under 35 U.S.C. § 119 of Korean Patent Application No. 10-2021-0001537, filed on Jan. 6, 2021, the entire content of which is hereby incorporated by reference.

BACKGROUND

1. Field of the Invention

The present disclosure herein relates to a method of manufacturing a thin film electrode for an electrochromic device and an electrochromic device including the same, and more particularly, to a method of manufacturing a thin film electrode for an electrochromic device containing Prussian blue nanoparticles, and an electrochromic device including the same.

2. Description of Related Art

Electrochromism refers to the reversible change in a material's optical properties such as color, transmittance, or reflectance under electrochemical reactions upon application of an electric field. Electrochromic devices cause changes in color through electrochemical reactions. In the electrochromic devices, when potential differences are induced by external electrical stimulation, ions or electrons included in electrolytes travel into electrochromic layers and cause redox reactions. The redox reactions of the electrochromic layers bring with them changes in transmittance or color of the electrochromic devices. Cathodic coloring materials refer to ones that are colored when cathodic reactions take place and are bleached when anodic reactions take place. Anodic coloring materials refer to ones that are colored when anodic reactions take place and are bleached when cathodic reactions take place. Against this backdrop, the electrochromic devices have been applied for various applications such as optical shutters, electrochromic mirrors (ECM) for vehicles, reflective displays, and smart windows.

SUMMARY

The present disclosure provides a method of manufacturing a thin film electrode for an electrochromic device containing Prussian blue nanoparticles, which may be dried at room temperature and be further cost-effective.

The present disclosure also provides an electrochromic device containing Prussian blue nanoparticles, which may be dried at room temperature and be further cost-effective.

The present disclosure is not limited to the technical problems described above, and those skilled in the art may understand other technical problems from the following description.

An embodiment of the inventive concept provides a method of manufacturing a thin film electrode for an electrochromic device, the method including: synthesizing insoluble Prussian blue nanoparticles; adding a surfactant to the insoluble Prussian blue nanoparticles to form water-soluble Prussian blue nanoparticles; adding a solvent and a binder to the water-soluble Prussian blue nanoparticles to form a mixed solution; applying the mixed solution onto an electrode; and performing a drying process on the electrode applied with the mixed solution, wherein the drying process may be performed at 15° C. to 30° C.

In an embodiment, the surfactant may include a salicylic acid-based compound.

In an embodiment, the surfactant may include at least one of lithium salicylate, sodium salicylate, or potassium salicylate.

In an embodiment, the surfactant may be contained in an amount of 0.5 parts by weight to 1.5 parts by weight with respect to 100 parts by weight of the insoluble Prussian blue nanoparticles.

In an embodiment, the drying process may be performed for 30 seconds to 15 minutes.

In an embodiment, the drying process may be performed without a heat treatment process.

In an embodiment, the solvent may include water or alcohol.

In an embodiment, the binder may include an alkoxysilane-based compound.

In an embodiment, the applying of the mixed solution onto the electrode may include at least one of spin coating, dip coating, bar coating, spray coating, slot die coating, doctor blade, or screen printing.

In an embodiment, the method may further include, before the applying of the mixed solution onto the electrode, applying a surface modification material onto the electrode, and performing a heat treatment process on the electrode applied with the surface modification material.

In an embodiment, the surface modification material may include water and polyethyleneimine (PEI), wherein the polyethyleneimine (PEI) may include branched polyethyleneimine (PEI) or linear polyethyleneimine (PEI).

In an embodiment, the polyethyleneimine (PEI) may be contained in an amount of 0.05 parts by weight to 0.5 parts by weight with respect to 100 parts by weight of the water.

In an embodiment of the inventive concept, an electrochromic device includes: a first transparent electrode and a second transparent electrode facing each other; an electrolyte layer disposed between the first transparent electrode and the second transparent electrode; a first electrochromic layer disposed between the first transparent electrode and the electrolyte layer; a second electrochromic layer disposed between the second transparent electrode and the electrolyte layer; a first surface modification layer interposed between the first transparent electrode and the first electrochromic layer; and a second surface modification layer interposed between the second transparent electrode and the second electrochromic layer.

In an embodiment, at least one of the first surface modification layer or the second surface modification layer may include water and polyethyleneimine (PEI), wherein the polyethyleneimine (PEI) may include branched polyethyleneimine (PEI) or linear polyethyleneimine (PEI).

In an embodiment, at least one of the first electrochromic layer or the second electrochromic layer may include Prussian blue nanoparticles made water soluble through a surfactant.

In an embodiment, the surfactant may include at least one of lithium salicylate, sodium salicylate, or potassium salicylate.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
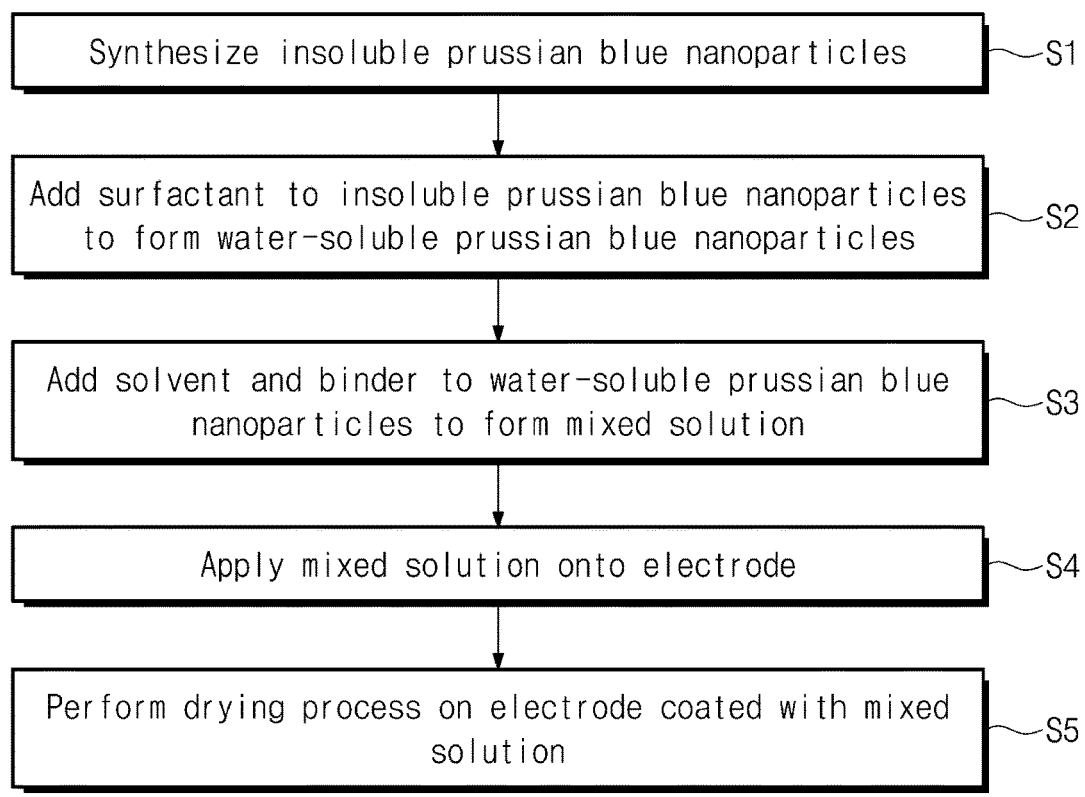
FIG. 1 is a flowchart for describing a method of manufacturing a thin film electrode for an electrochromic device according to an embodiment of the inventive concept.

Advantages and features of the present disclosure and methods of accomplishing the same may be understood more readily by reference to the following detailed description of embodiments and the accompanying drawings. However, the present disclosure may be embodied in different forms, and these embodiments are provided only to make this disclosure thorough and complete and to fully convey the scope of the present disclosure to those skilled in the art, and thus the present disclosure is defined only by the scope of the appended claims. Like reference numerals denote like elements throughout specification.

Terms used herein are not for limiting the present disclosure but for describing the embodiments. Unless otherwise defined, terms used in the embodiments may be understood as meanings generally known to those skilled in the art. The terms of a singular form may include plural forms unless otherwise specified. It will be further understood that the terms "comprises" and/or "comprising", when used 'in this description, specify the presence of stated elements, steps, operations, and/or components, but do not preclude the presence or addition of one or more other elements, steps, operations, and/or components.

In the description, it is to be noted that when a surface (or layer) is referred to as being 'on' another surface (or layer) or substrate, it may be directly formed on another surface (or layer) or substrate, or a third surface (or layer) may also be interposed therebetween. Although terms like a first, a second, and a third are used to describe various regions and surfaces (layers) in various embodiments of the description, these regions and surfaces (layers) should not be limited to these terms. These terms are used only to tell one region or surface (layer) from another region or surface (layer).

Additionally, the embodiments described in the description will be explained with reference to the cross-sectional views and/or plan views as ideal example views of the present disclosure. In the drawing, the thicknesses of films and regions are exaggerated for effective description of the technical contents. Therefore, a form of an example view may be modified by a manufacturing method and/or tolerance. Accordingly, the embodiments of the present disclosure are not limited to the specific shape illustrated in the example views, but may include other shapes that are created according to manufacturing processes. Thus, areas exemplified in the drawings have general properties, and shapes of the exemplified areas are used to illustrate a specific shape of a device region. Therefore, this should not be construed as limited to the scope of the present disclosure.

FIG. 1 is a flowchart for describing a method of manufacturing a thin film electrode for an electrochromic device according to an embodiment of the inventive concept.

Referring to FIG. 1, a method of manufacturing a thin film electrode for an electrochromic device according to an embodiment of the inventive concept may include: synthesizing insoluble Prussian blue nanoparticles (S1); adding a surfactant to the insoluble Prussian blue nanoparticles to form water-soluble Prussian blue nanoparticles (S2); adding a solvent and a binder to the water-soluble Prussian blue nanoparticles to form a mixed solution (S3); applying the mixed solution onto an electrode (S4); and performing a drying process on the electrode applied with the mixed solution (S5).

The synthesizing of insoluble Prussian blue nanoparticles (S1) may include a process of mixing a solution containing ferrocyanide ions ($[Fe(CN)_6]^{4-}$) with a solution containing iron ions ($Fe^{3+}$). The insoluble Prussian blue nanoparticles may be precipitated through the mixing process.

The Prussian blue nanoparticles may be an inorganic electrochromic material containing iron. The Prussian blue nanoparticles may be an anodic coloring material that is colored upon an anodic reaction, and is bleached upon a cathodic reaction. The Prussian blue nanoparticles are materials having stable oxidation state, and may be blue in color with Formula of $Fe_4^{III}[Fe^{II}(CN)_6]_3$ in the oxidation state, and may be transparent with Formula of $Fe_4^{II}[Fe^{II}(CN)_6]_3$ as turning to a reduced state in response to an externally applied voltage. That is, basically the Prussian blue nanoparticles turn into a different color due to the oxidation/reduction reaction of iron, and thus come in various colors (e.g., yellow, green, and the like) according to the number of valence electrons present in iron. In general, the Prussian blue nanoparticles may be insoluble.

The method of manufacturing a thin film electrode for an electrochromic device according to an embodiment of the inventive concept may include adding a surfactant to the insoluble Prussian blue nanoparticles to form water-soluble Prussian blue nanoparticles (S2). That is, the adding of a surfactant to the insoluble Prussian blue nanoparticles may result in forming water-soluble Prussian blue nanoparticles.

Through the surfactant, the insoluble Prussian blue nanoparticles may be modified into water-soluble Prussian blue nanoparticles, and accordingly, the water-soluble Prussian blue nanoparticles may be dried at room temperature upon a subsequent drying process.

The surfactant may include a salicylic acid-based compound. For example, the surfactant may include at least one of lithium salicylate, sodium salicylate, or potassium salicylate. The surfactant may be contained in an amount of 0.5 parts by weight to 1.5 parts by weight with respect to 100 parts by weight of the insoluble Prussian blue nanoparticles.

The method of manufacturing a thin film electrode for an electrochromic device according to an embodiment of the inventive concept may include adding a solvent and a binder to the water-soluble Prussian blue nanoparticles to form a mixed solution (S3).

The solvent may include a polar solvent. For example, the solvent may include water or alcohol. More specifically, the solvent may include water, ethanol, methanol, propylene carbonate (PC), ethylene carbonate (EC), diethyl carbonate (DEC), or the like.

The binder may include an alkoxysilane-based compound. For example, the binder may include tetraethyl orthosilicate (TEOS).

Before the applying of the mixed solution to an electrode, the method may further include applying a surface modification material onto the electrode, and performing a heat treatment process on the electrode applied with the surface modification material.

The surface modification material may include water and polyethyleneimine (PEI). The polyethyleneimine (PEI) may include branched polyethyleneimine (PEI) or linear polyethyleneimine (PEI). The polyethyleneimine (PEI) may be contained in an amount of 0.05 parts by weight to 0.5 parts by weight with respect to 100 parts by weight of water. The surface modification material is a material that does not affect the electrical properties and transmittance of an electrode, and may serve to effectively bond the electrode with an electrochromic material.

The method of manufacturing a thin film electrode for an electrochromic device according to an embodiment of the inventive concept may include applying the mixed solution onto an electrode (S4).

The applying of the mixed solution onto the electrode may include at least one of spin coating, dip coating, bar coating, spray coating, slot die coating, doctor blade, or screen printing.

The electrode may include a transparent electrode. For example, the electrode may include indium tin oxide (ITO).

The electrode may be an electrode formed on a substrate. That is, the mixed solution may be applied to the electrode on the substrate. The substrate may include at least one of a plastic substrate, a flexible substrate, a cellulose substrate, or a fiber substrate. The method of manufacturing a thin film electrode for an electrochromic device according to an embodiment of the inventive concept may not include a heat treatment process, and thus may use a substrate having poor heat resistance without limitation.

The method of manufacturing a thin film electrode for an electrochromic device according to an embodiment of the inventive concept may include performing a drying process on the electrode applied with the mixed solution (S5).

The drying process may be performed at 15° C. to 30° C. The drying process may be performed for 30 seconds to 15 minutes. The drying process may not include a heat treatment process.

Typically, a drying process is required at a high temperature (e.g., 120° C. or higher) to apply Prussian blue to the electrode, and thus, a heat treatment process is required to be accompanied. However, increasing time for the heat treatment causes the electrode to be delaminated from the substrate or the electrode to be deformed.

In the manufacture of the thin film electrode for an electrochromic device according to an embodiment of the inventive concept, the electrode applied with the mixed solution is naturally dried at room temperature, and thus a heat treatment process may not be required. In addition, the deliminating of the electrode from the substrate or the deforming of the electrode may be prevented to allow various substrates to be used without limitation. In addition, in the manufacture of the thin film electrode for an electrochromic device, process cost and time may be reduced.

In some embodiments, after the performing of a drying process on the electrode applied with the mixed solution, the method may further include performing a heat treatment process after an aging period of 24 hours. The heat treatment process may be performed at 120° C. In this case, the performing of the heat treatment process after the aging period of 24 hours may prevent the electrode being delaminated from the substrate.

Figure 2:
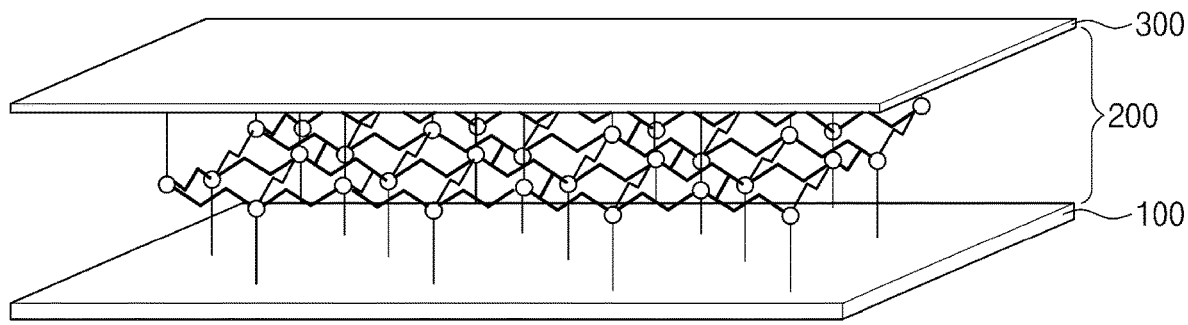
FIG. 2 is a perspective view for describing a thin film electrode for an electrochromic device according to an embodiment of the inventive concept.

FIG. 2 is a perspective view for describing a thin film electrode for an electrochromic device according to an embodiment of the inventive concept. FIG. 2 shows a thin film electrode for an electrochromic device manufactured according to the method of manufacturing a thin film electrode for an electrochromic device described above with reference to FIG. 1.

Referring to FIG. 2, the thin film electrode for an electrochromic device according to an embodiment of the inventive concept may include a transparent electrode 100, a surface modification layer 200, and an electrochromic layer 300. The electrochromic layer 300 may be disposed on the transparent electrode 100. The surface modification layer 200 may be interposed between the transparent electrode 100 and the electrochromic layer 300. The transparent electrode 100 and the electrochromic layer 300 may adhere to each other through the surface modification layer 200. Although the surface modification layer 200 is enlarged and shown for description, the thickness of the surface modification layer 200 may be smaller than that shown in FIG. 2.

For example, the transparent electrode 100 may include indium tin oxide (ITO).

The surface modification layer 200 may include water and polyethyleneimine (PEI). The polyethyleneimine (PEI) may include branched polyethyleneimine (PEI) or linear polyethyleneimine (PEI). The polyethyleneimine (PEI) may be contained in an amount of 0.05 parts by weight to 0.5 parts by weight with respect to 100 parts by weight of the water.

The transparent electrode 100 and the electrochromic layer 300 may adhere to each other through the surface modification layer 200. More specifically, a chemical bond may be formed between the transparent electrode 100 and the electrochromic layer 300 through the surface modification layer 200.

The electrochromic layer 300 may include Prussian blue nanoparticles made water soluble through a surfactant. The surfactant may include a salicylic acid-based compound. For example, the surfactant may include at least one of lithium salicylate, sodium salicylate, or potassium salicylate. According to an embodiment of the inventive concept, the electrochromic layer 300 may be dried at room temperature.

When a voltage is applied to the thin film electrode for an electrochromic device, electrons may easily travel through the surface modification layer 200. That is, even when the thin film electrode for an electrochromic device of an embodiment of the inventive concept includes the surface modification layer 200, electrons may travel through the surface modification layer 200. In addition, adhesion properties between the transparent electrode 100 and the electrochromic layer 300 may be further enhanced through the surface modification layer 200.

FIGS. 3A to 3D show results obtained by measuring electrochemical properties of a thin film electrode for an electrochromic device according to an embodiment of the inventive concept through cyclic voltammetry.

Figure 3A:
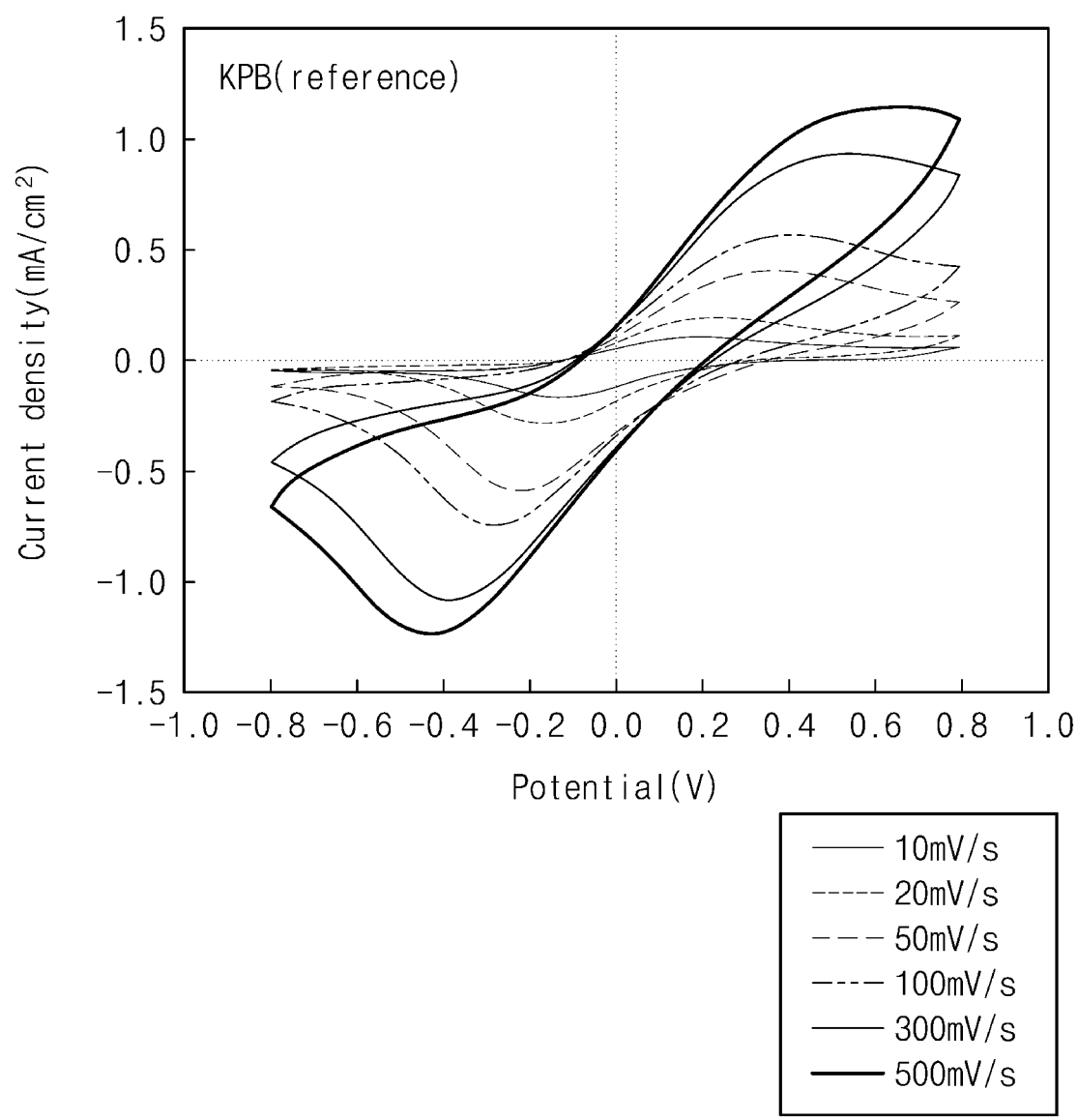
FIGS. 3A to 3D show results obtained by measuring electrochemical properties of a thin film electrode for an electrochromic device according to an embodiment of the inventive concept through cyclic voltammetry.
Figure 3B:
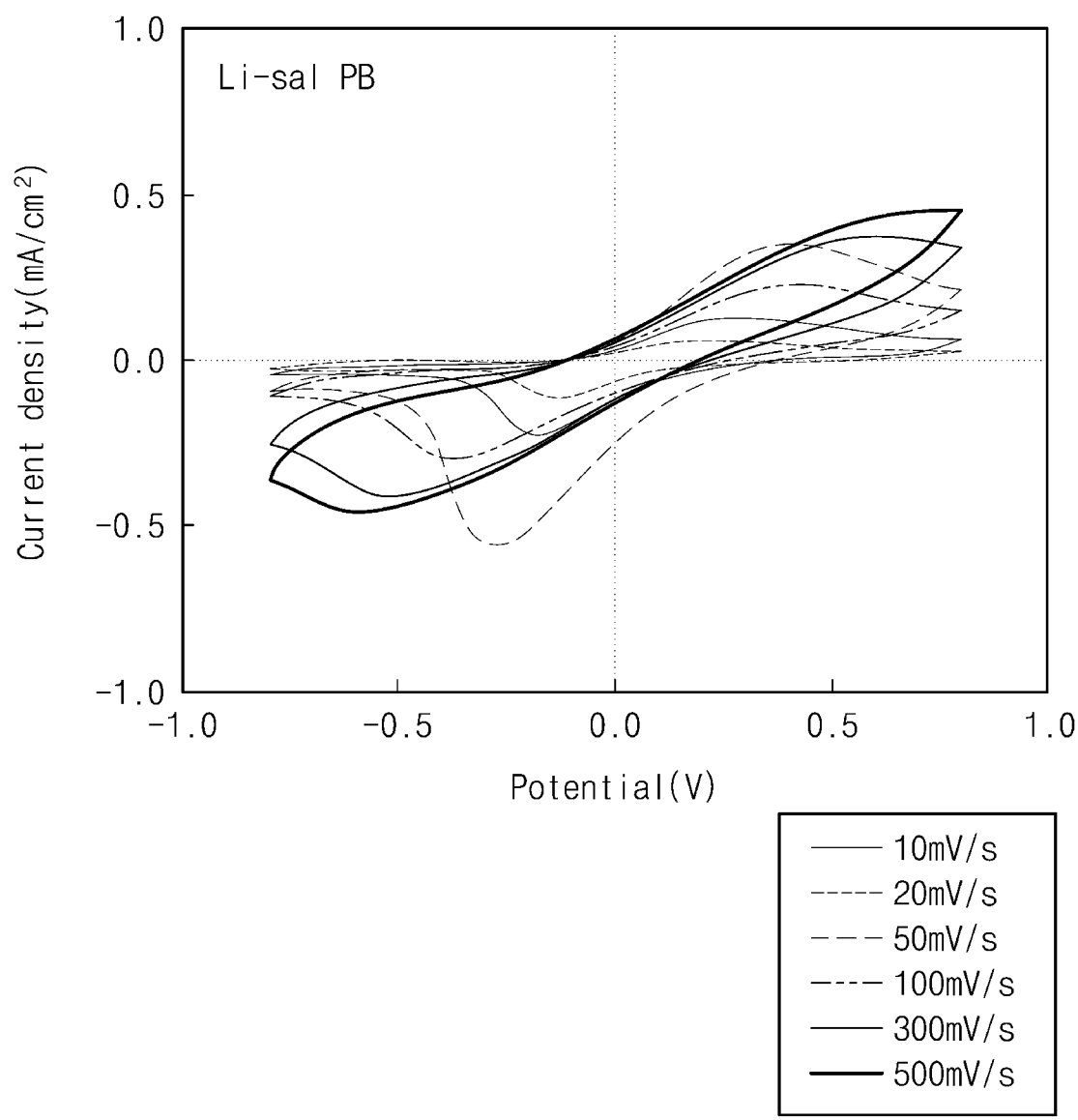
Figure 3C:
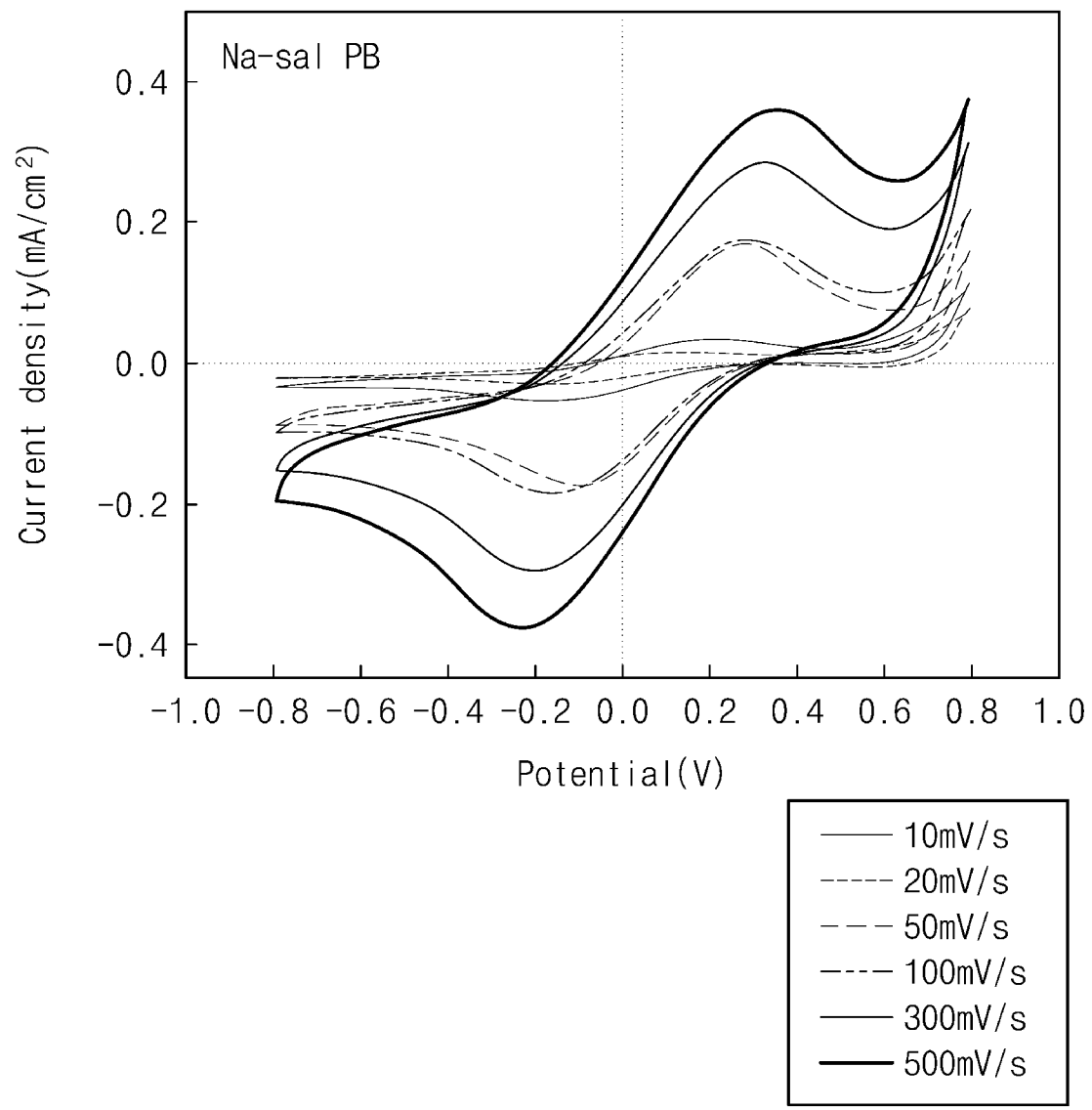
Figure 3D:
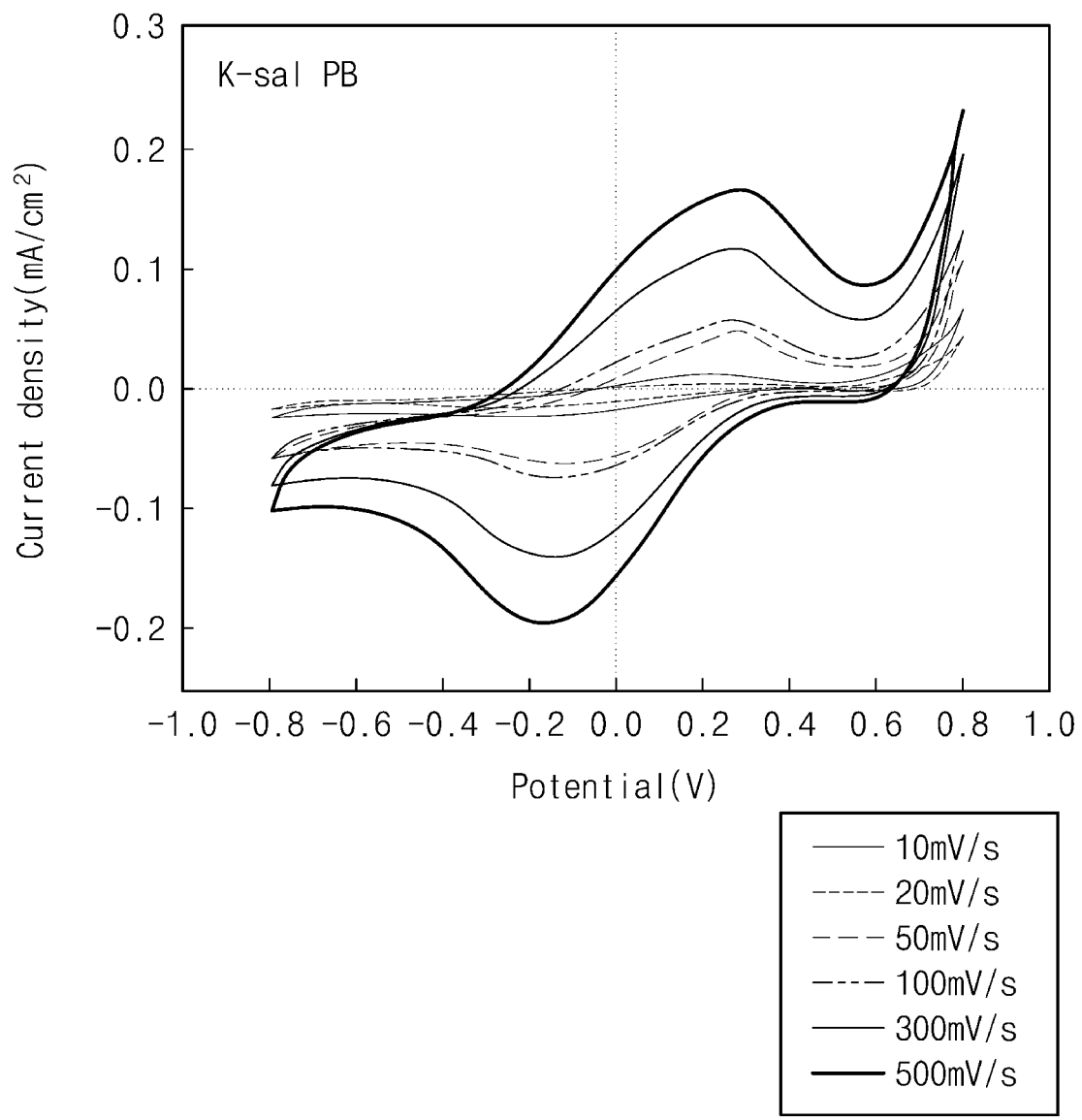

Specifically, FIG. 3A shows results obtained by measuring electrochemical properties of a thin film electrode (KPB (reference)) for an electrochromic device manufactured using potassium hexacyanoferrate ($K_4Fe(CN)_6$) through cyclic voltammetry. FIG. 3B shows results obtained by measuring electrochemical properties of a thin film electrode (Li-sal PB) for an electrochromic device manufactured using lithium salicylate as a surfactant through cyclic voltammetry. FIG. 3C shows results obtained by measuring electrochemical properties of a thin film electrode (Na-sal PB) for an electrochromic device manufactured using sodium salicylate as a surfactant through cyclic voltammetry. FIG. 3B shows results obtained by measuring electrochemical properties of a thin film electrode (K-sal PB) for an electrochromic device manufactured using potassium salicylate as a surfactant through cyclic voltammetry. The cyclic voltammetry was measured only with respect to turning into blue and transparent colors of a thin film electrode, and the color of the thin film electrode turns to blue at (+) voltage and turns to transparent at (−) voltage.

Referring to FIGS. 3A to 3D, it is seen that electrons are readily injected/discharged in all thin film electrodes for electrochromic devices. However, it is observed that the amount of flowing current decreases in the order of the thin film electrode (Li-sal PB) for an electrochromic device manufactured using lithium salicylate>the thin film electrode (Na-sal PB) for an electrochromic device manufactured using sodium salicylate>the thin film electrode (K-sal PB) for an electrochromic device manufactured using potassium salicylate.

FIGS. 4A to 4D show X-ray photoelectron spectroscopy (XPS) results of a thin film electrode for an electrochromic device according to an embodiment of the inventive concept.

Figure 4A:
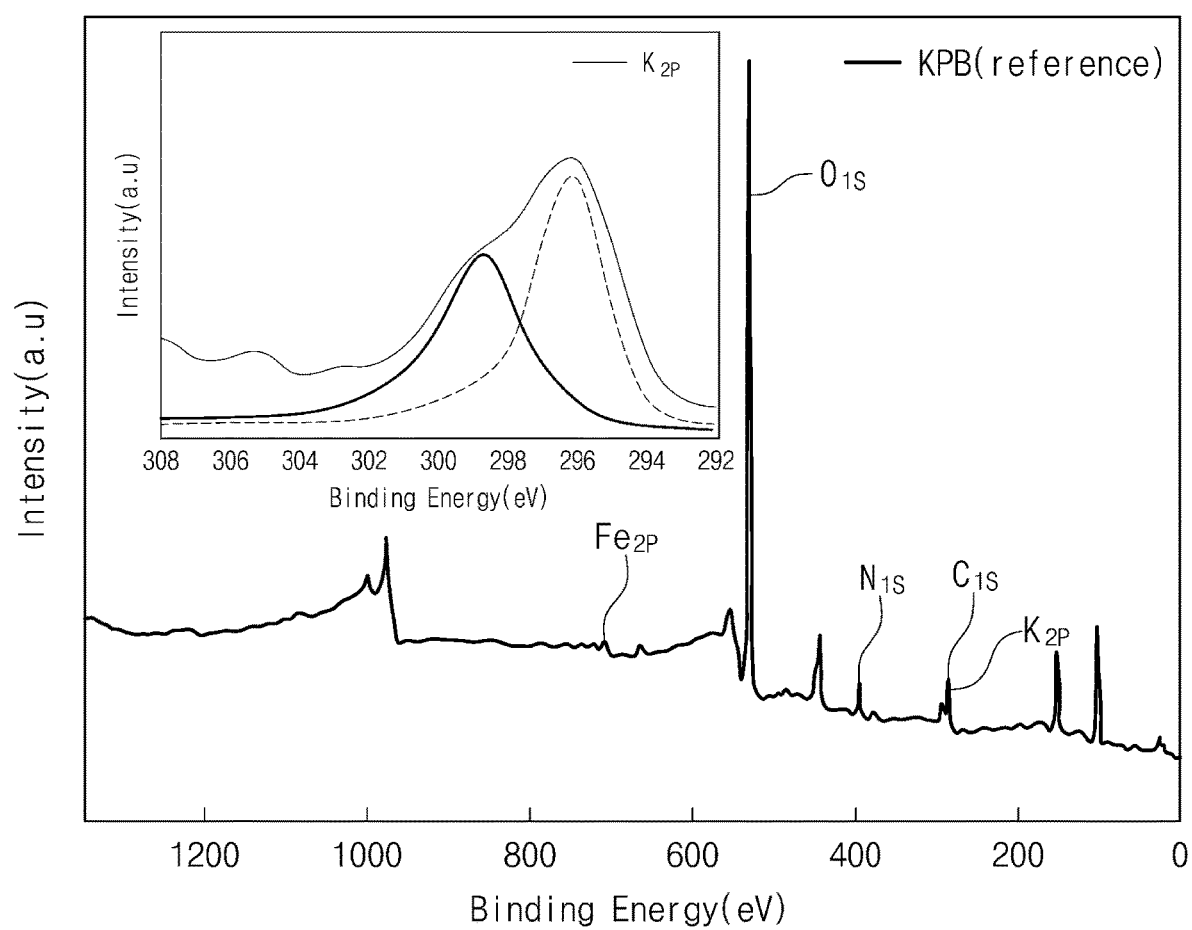
FIGS. 4A to 4D show X-ray photoelectron spectroscopy (XPS) results of a thin film electrode for an electrochromic device according to an embodiment of the inventive concept.
Figure 4B:
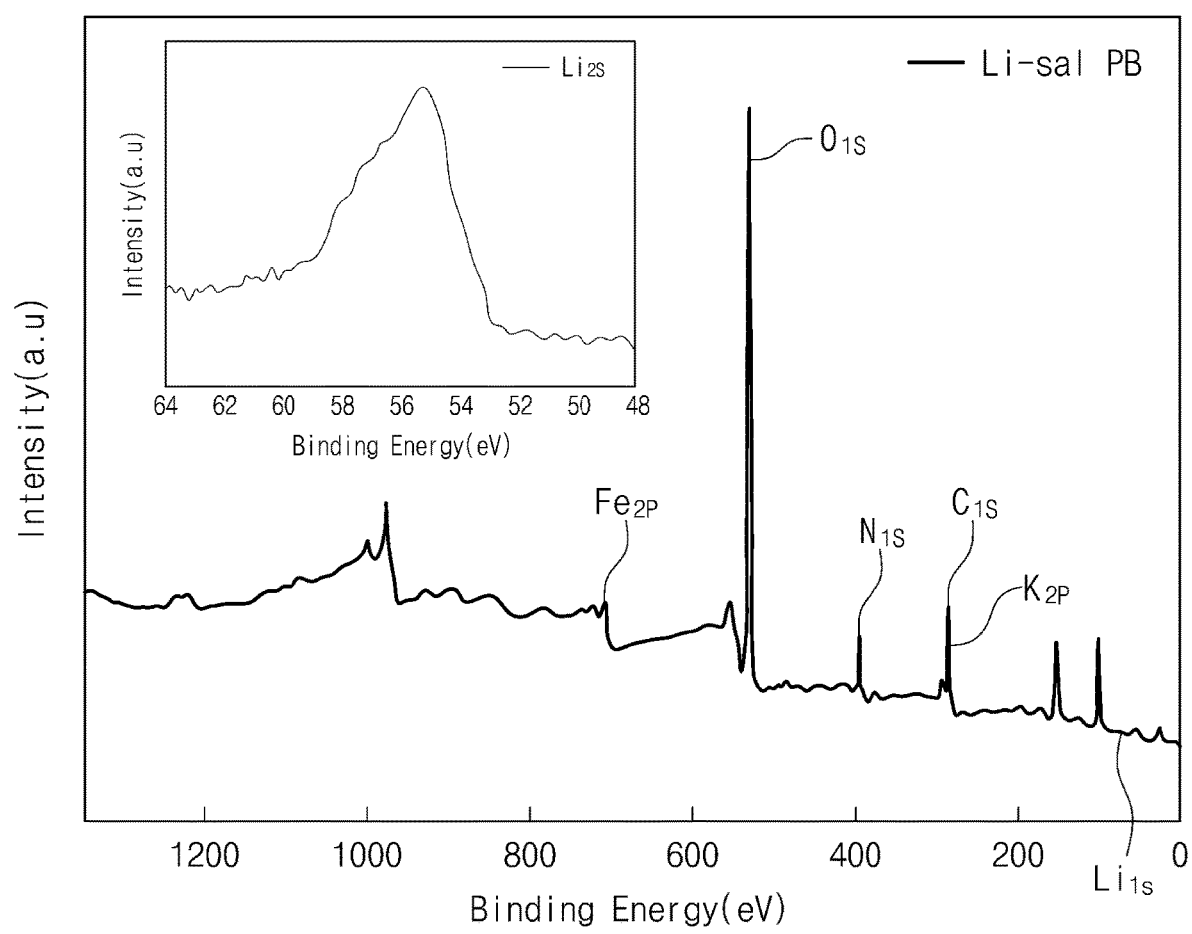
Figure 4C:
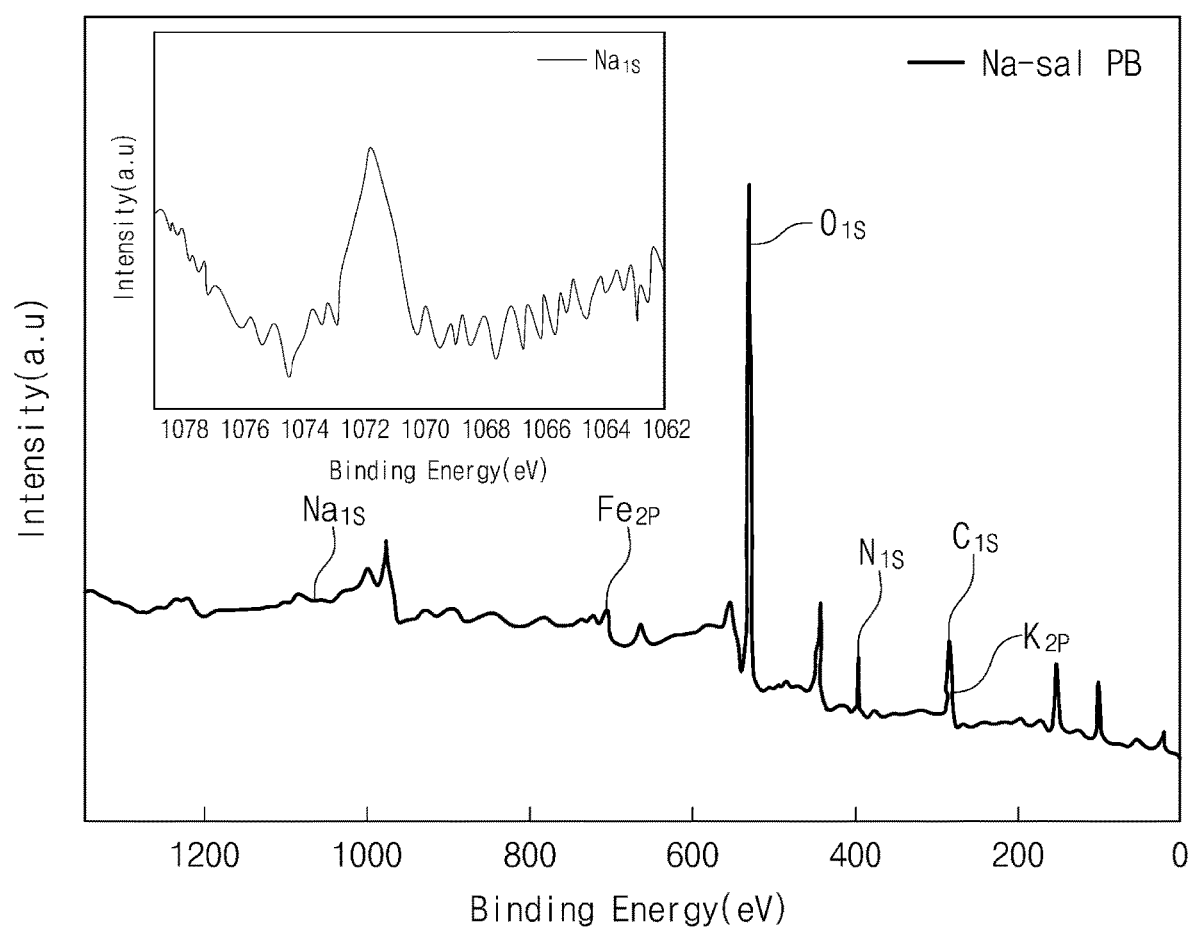
Figure 4D:
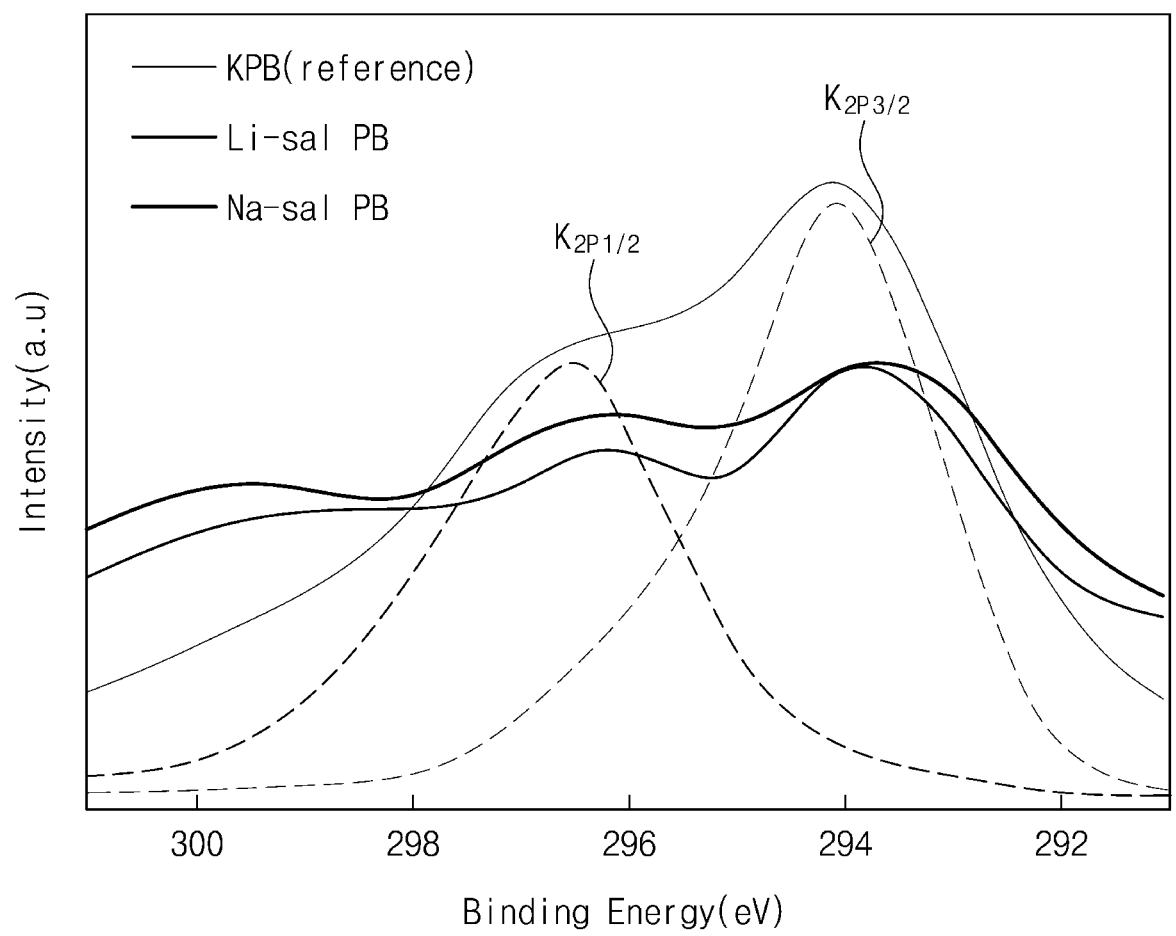

Specifically, FIG. 4A shows X-ray photoelectron spectroscopy (XPS) results of a thin film electrode (KPB (reference)) for an electrochromic device manufactured using potassium hexacyanoferrate ($K_4Fe(CN)_6$) through cyclic voltammetry. FIG. 4B shows X-ray photoelectron spectroscopy (XPS) results of a thin film electrode (Li-sal PB) for an electrochromic device manufactured using lithium salicylate as a surfactant through cyclic voltammetry. FIG. 4C shows X-ray photoelectron spectroscopy (XPS) results of a thin film electrode (Na-sal PB) for an electrochromic device manufactured using sodium salicylate as a surfactant through cyclic voltammetry. FIG. 4D shows X-ray photoelectron spectroscopy (XPS) results of thin film electrodes (KPB (reference), Li-sal PB, and Na-sal PB) for electrochromic devices.

Referring to FIGS. 4A to 4D, peaks corresponding to targeted elements were identified in all thin film electrodes for electrochromic devices. In particular, peaks corresponding to elements included in Prussian blue were identified. In addition, referring to FIGS. 4B and 4C, peaks corresponding to cations included in salicylic acid were identified. Referring to FIG. 4D, it was seen that the amount of potassium ions was decreased compared to that of the thin film electrode (KPB (reference)) for an electrochromic device.

Figure 5:
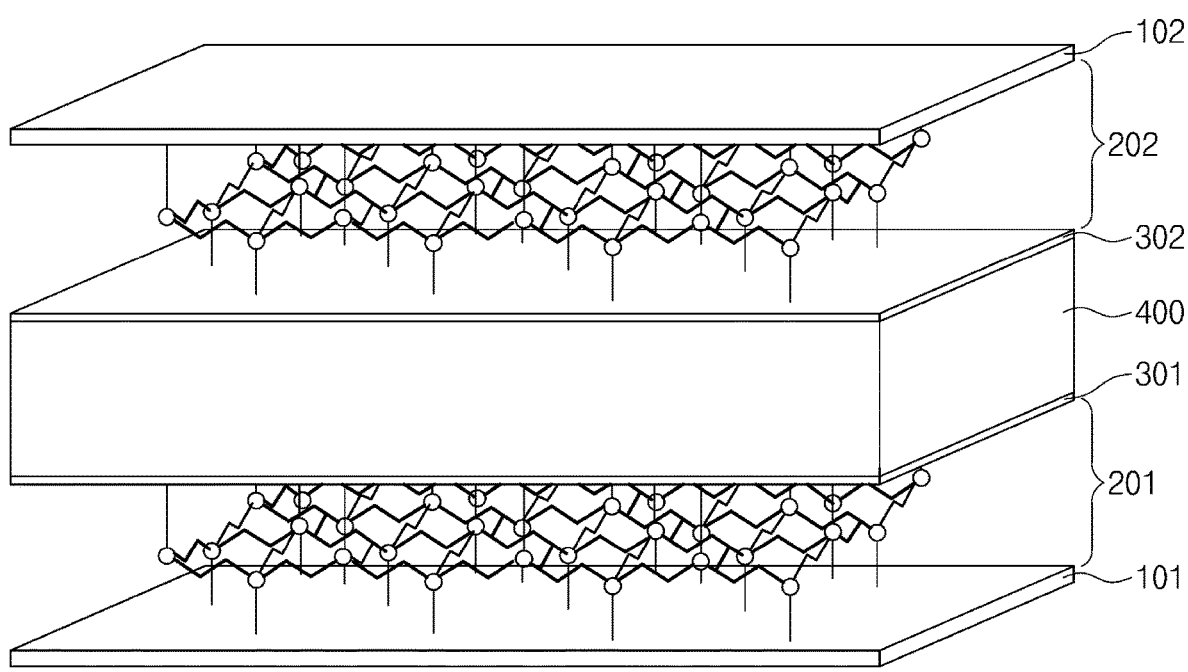
FIG. 5 is a perspective view for describing an electrochromic device according to an embodiment of the inventive concept.

FIG. 5 is a perspective view for describing an electrochromic device according to an embodiment of the inventive concept.

Referring to FIG. 5, an electrochromic device according to an embodiment of the inventive concept may include a first transparent electrode 101, a second transparent electrode 102, a first surface modification layer 201, a second surface modification layer 202, a first electrochromic layer 301, a second electrochromic layer 302, and an electrolyte layer 400.

The first transparent electrode 101 and the second transparent electrode 102 facing each other may be provided. The electrolyte layer 400 may be disposed between the first transparent electrode 101 and the second transparent electrode 102. The first electrochromic layer 301 may be disposed between the first transparent electrode 101 and the electrolyte layer 400. The second electrochromic layer 302 may be disposed between the second transparent electrode 102 and the electrolyte layer 400. The first surface modification layer 201 may be interposed between the first transparent electrode 101 and the first electrochromic layer 301. The second surface modification layer 202 may be interposed between the second transparent electrode 102 and the second electrochromic layer 302.

The first transparent electrode 101 and the first electrochromic layer 301 may adhere to each other through the first surface modification layer 201. More specifically, a chemical bond may be formed between the first transparent electrode 101 and the first electrochromic layer 301 through the first surface modification layer 201. The second transparent electrode 102 and the second electrochromic layer 302 may adhere to each other through the second surface modification layer 202. More specifically, a chemical bond may be formed between the second transparent electrode 102 and the second electrochromic layer 302 through the second surface modification layer 202. Although the first and second surface modification layers 201 and 202 are enlarged and shown for description, the thicknesses of the first and second surface modification layers 201 and 202 may be smaller than those shown in FIG. 5.

The first transparent electrode 101 and the second transparent electrode 102 may include at least one of a metal oxide electrode, a stacked electrode having an oxide-metal-oxide (OMO) structure, a polymer electrode (e.g., PEDOT:PSS, and the like), or a carbon-based electrode. For example, the metal oxide electrode may include at least one of indium tin oxide (ITO), fluorine doped tin oxide (FTO), or antimonium doped zinc oxide (AZO). For example, the polymer electrode may include PEDOT:PSS, and the like. For example, the carbon-based electrode may include at least one of graphene or carbon nanotube (CNT).

At least one of the first surface modification layer 201 or the second surface modification layer 202 may include water and polyethyleneimine (PEI). The polyethyleneimine (PEI) may include branched polyethyleneimine (PEI) or linear polyethyleneimine (PEI). The polyethyleneimine (PEI) may be contained in an amount of 0.05 parts by weight to 0.5 parts by weight with respect to 100 parts by weight of the water.

At least one of the first electrochromic layer 301 or the second electrochromic layer 302 may include Prussian blue nanoparticles made water soluble through a surfactant. The surfactant may include a salicylic acid-based compound. For example, the surfactant may include at least one of lithium salicylate, sodium salicylate, or potassium salicylate. According to an embodiment of the inventive concept, at least one of the first electrochromic layer 301 or the second electrochromic layer 302 may be dried at room temperature.

In some embodiments, the first electrochromic layer 301 and the second electrochromic layer 302 may include electrochromic materials having different driving directions. For example, the first electrochromic layer 301 may include a cathodic coloring material, and the second electrochromic layer 302 may include an anodic coloring material. For example, the first electrochromic layer 301 may include at least one of a metal oxide or a polymer. For example, the metal oxide may include at least one of tungsten oxide ($WO_3$) or molybdenum oxide ($MoO_3$), and the polymer may include PEDOT:PSS, and the like. The second electrochromic layer 302 may include at least one of a metal oxide such as $NiO_x$ or $V_2O_5$, a polymer such as PANI, or Prussian blue nanoparticles made water soluble through a surfactant.

For another example, the first electrochromic layer 301 may include an anodic coloring material, and the second electrochromic layer 302 may include a cathodic coloring material. For example, the first electrochromic layer 301 may include at least one of a metal oxide such as $NiO_x$ or $V_2O_5$, a polymer such as PANI, or Prussian blue nanoparticles made water soluble through a surfactant, and the second electrochromic layer 302 may include at least one of a metal oxide or a polymer. For example, the metal oxide may include at least one of tungsten oxide ($WO_3$) or molybdenum oxide ($MoO_3$). The polymer may include PEDOT:PSS, and the like.

The electrolyte layer 400 may include an electrolyte. The electrolyte may include a monovalent cation and a monovalent anion. For example, the monovalent cation may be $H^+$, $Li^+$, $Na^+$, $K^+$, or $NH^+$. For example, the electrolyte may include at least one of $LiClO_4$, $LiBF_4$, $LiPF_6$, or LiTFSI(tri(fluoromethansulfonimide)lithium salt). The electrolyte layer 400 may further include a solvent, the solvent may include organic solvents such as water, ethanol, methanol, propylene carbonate (PC), ethylene carbonate (EC), diethyl carbonate (DEC), and the like, and the above organic solvents may be used alone or in an appropriate combination. When a voltage is applied to an electrochromic device from the outside, electrons may easily travel through the first surface modification layer 201 and the second surface modification layer 202. That is, although the electrochromic device of an embodiment of the inventive concept includes the first surface modification layer 201 and the second surface modification layer 202, electrons may travel through the first surface modification layer 201 and the second surface modification layer 202. In addition, adhesion properties between the first transparent electrode 101 and the first electrochromic layer 301 may be further enhanced through the first surface modification layer 201. Adhesion properties between the second transparent electrode 102 and the second electrochromic layer 302 may be further enhanced through the second surface modification layer 202.

Figure 6:
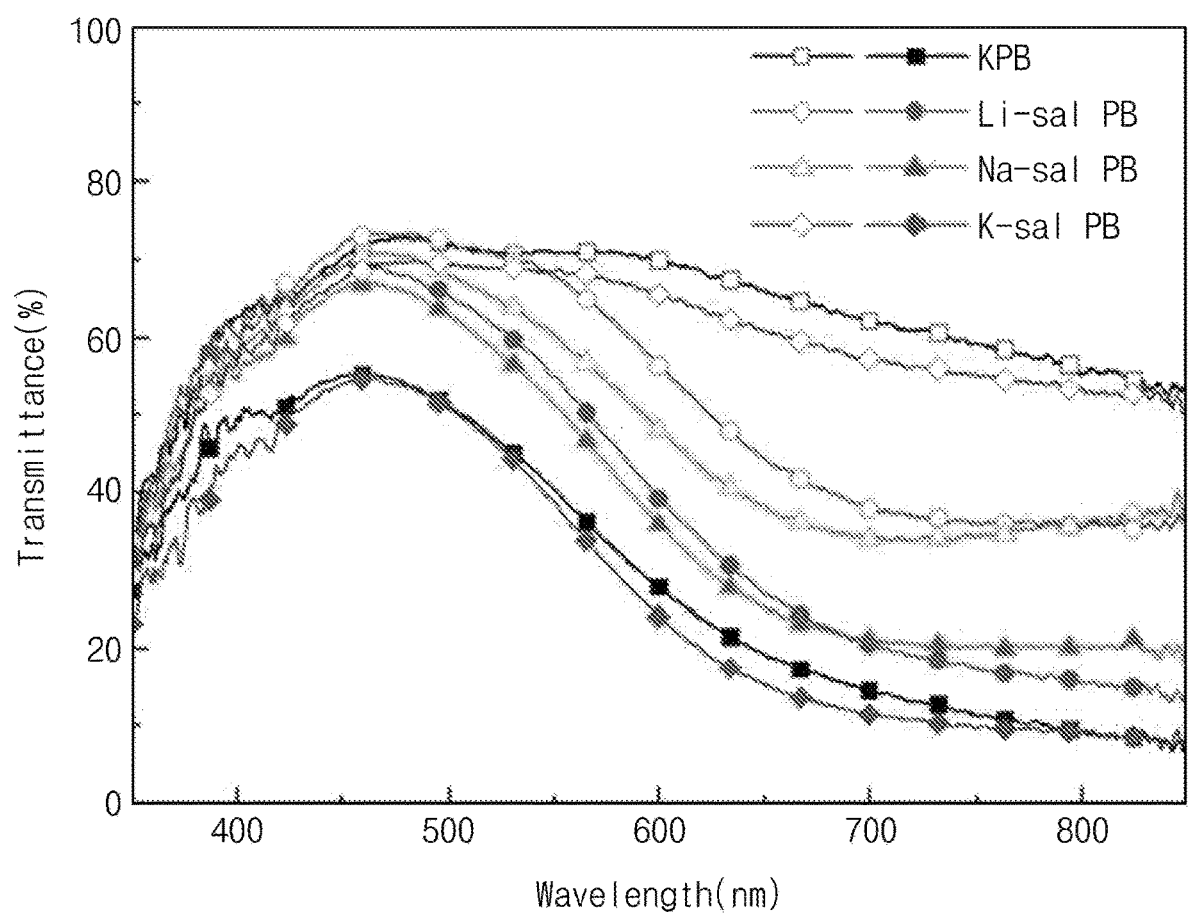
FIG. 6 shows results obtained by measuring transmittance according to wavelength of an electrochromic device according to an embodiment of the inventive concept.

FIG. 6 shows results obtained by measuring transmittance according to wavelength of an electrochromic device according to an embodiment of the inventive concept. In this case, the first electrochromic layer 301 includes tungsten oxide ($WO_3$), and the second electrochromic layer 302 includes Prussian blue nanoparticles made water soluble through a surfactant. More specifically, an electrochromic electrode with the first transparent electrode 101 bonded to the first electrochromic layer 301 containing tungsten oxide ($WO_3$) as a working electrode, and the second transparent electrode 102 as a counter electrode was manufactured, and subjected to measurement of transmittance according to wavelength. In this case, each of a thin film electrode (KPB (reference)) for an electrochromic device manufactured using potassium hexacyanoferrate ($K_4Fe(CN)_6$); a thin film electrode (Li-sal PB) for an electrochromic device manufactured using lithium salicylate as a surfactant; a thin film electrode (Na-sal PB) for an electrochromic device manufactured using sodium salicylate as a surfactant, and a thin film electrode (K-sal PB) for an electrochromic device manufactured using potassium salicylate as a surfactant were configured as a counter electrode.

The electrochromic device was driven at a voltage of −1.5 V (blue)/+1.5 V (transparent). In this case, the voltage and the sign of the thin film electrode for an electrochromic device described with reference to FIGS. 3A to 3D are different due to the fact that the second transparent electrode 102 bonded to the second electrochromic layer 302 containing Prussian blue nanoparticles was used as a counter electrode.

Referring to FIG. 6, it was seen that all electrochromic devices were operable. However, it is seen that the electrochromic device with a counter electrode of a thin film electrode (K-sal PB) for an electrochromic device manufactured using potassium salicylate had the greatest transmittance conversion. In addition, it was seen that the case had the greatest and most distinct color conversion even with the naked eye.

According to a method of manufacturing a thin film electrode for an electrochromic device of the present disclosure, an electrode applied with a mixed solution containing Prussian blue nanoparticles may be naturally dried at room temperature. That is, the drying process may not include a heat treatment process. Accordingly, the deliminating of the electrode from the substrate or the deforming of the electrode may be prevented to allow various substrates to be used without limitation. In addition, in the manufacture of the thin film electrode for an electrochromic device, process cost and time may be reduced.

Although the embodiments of the inventive concept have been described above with reference to the accompanying drawings, those skilled in the art to which the inventive concept pertains may implement the inventive concept in other specific forms without changing the technical idea or essential features thereof. Therefore, the above-described embodiments are to be considered in all aspects as illustrative and not restrictive.

What is claimed is:

1. A method of manufacturing a thin film electrode for an electrochromic device, the method comprising:
   synthesizing insoluble Prussian blue nanoparticles;
   adding a surfactant to the insoluble Prussian blue nanoparticles to form water-soluble Prussian blue nanoparticles;
   adding a solvent and a binder to the water-soluble Prussian blue nanoparticles to form a mixed solution;
   applying the mixed solution onto an electrode; and
   performing a drying process on the electrode applied with the mixed solution,
   wherein the drying process is performed at of 15° C. to 30° C.

2. The method of claim 1, wherein the surfactant comprises a salicylic acid-based compound.

3. The method of claim 1, wherein the surfactant comprises at least one of lithium salicylate, sodium salicylate, or potassium salicylate.

4. The method of claim 1, wherein the surfactant is contained in an amount of 0.5 parts by weight to 1.5 parts by weight with respect to 100 parts by weight of the insoluble Prussian blue nanoparticles.

5. The method of claim 1, wherein the drying process is performed for 30 seconds to 15 minutes.

6. The method of claim 1, wherein the drying process is performed without a heat treatment process.

7. The method of claim 1, wherein the solvent comprises water or alcohol.

8. The method of claim 1, wherein the binder comprises an alkoxysilane-based compound.

9. The method of claim 1, wherein the applying of the mixed solution onto the electrode comprises at least one of spin coating, dip coating, bar coating, spray coating, slot die coating, doctor blade, or screen printing.

10. The method of claim 1, further comprising:
before the applying of the mixed solution onto the electrode, applying a surface modification material onto the electrode; and
performing a heat treatment process on the electrode applied with the surface modification material.

11. The method of claim 10, wherein the surface modification material comprises water and polyethyleneimine (PEI),
the polyethyleneimine (PEI) including branched polyethyleneimine (PEI) or linear polyethyleneimine (PEI).

12. The method of claim 11, wherein the polyethyleneimine (PEI) is contained in an amount of 0.05 parts by weight to 0.5 parts by weight with respect to 100 parts by weight of the water.

* * * * *